United States Patent Office
3,067,946
Patented Dec. 11, 1962

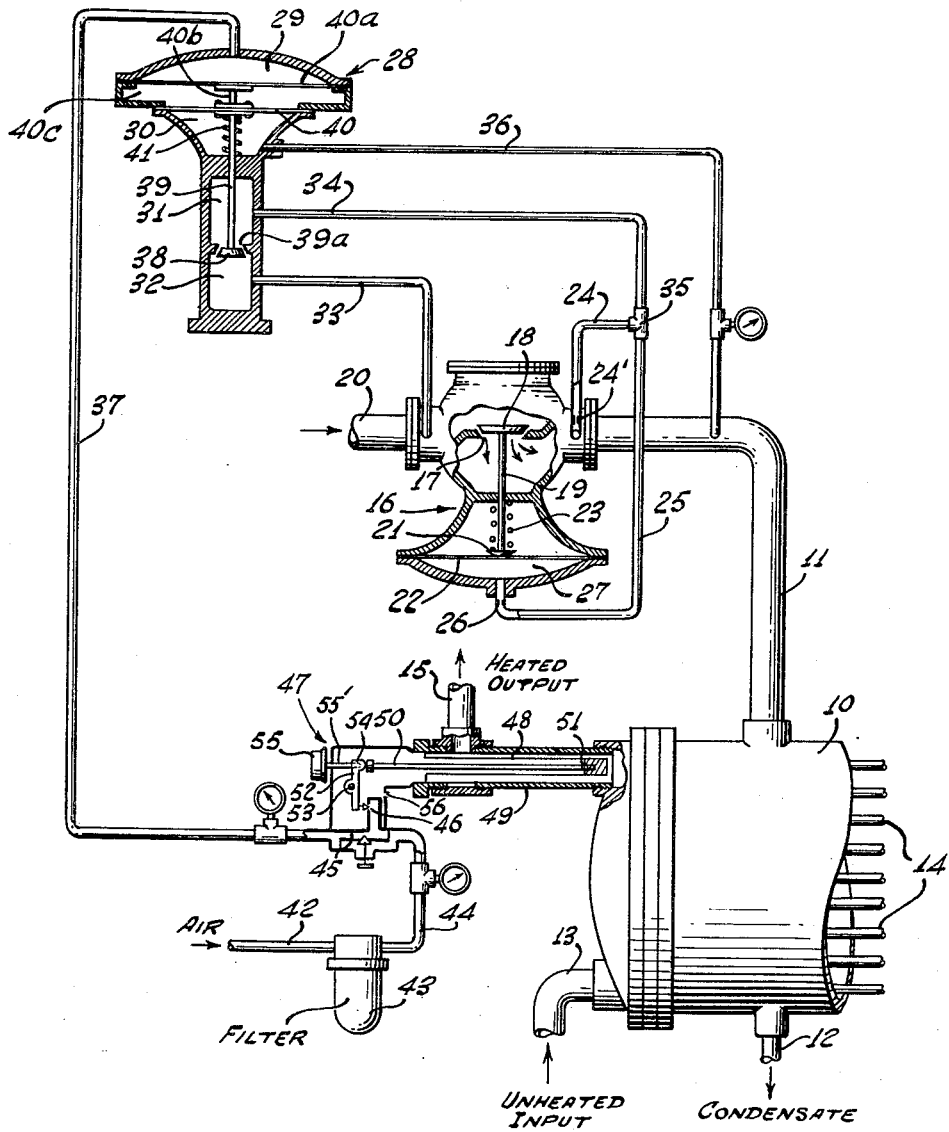

3,067,946
PILOTED SELF-OPERATIVE HOT WATER SUPPLY SYSTEM
Paulsen Spence, Baton Rouge, La.
Filed Dec. 14, 1959, Ser. No. 859,337
2 Claims. (Cl. 236—80)

This invention, generally, relates to control systems which are adaptable for use with hot water supplies and the like and, more particularly, to a pilot controlled, self-operated regulator control system.

It is a primary object of this invention to provide a refined control system within a cost bracket which is commercially competitive.

Another important object of the invention is to provide a control system for a hot water supply and the like that is comparable in accuracy and reliability with refined instrument systems.

Generally, one form of the invention is characterized by a self operated pressure regulator connected in the heat input side of a heat exchanger. A fluid controlled pilot valve is connected to supplement the control of the regulator, and means is provided to connect a source of fluid pressure to the pilot valve to actuate the pilot valve in response to the temperature of the hot water output from the heat exchanger.

In a preferred form of the invention, steam pressure at the heat input side of the heat exchanger is connected with the pilot valve to supplement control of the pilot valve in advance of a change in temperature of the hot water output. If desired, the system of the invention permits the connection of a pressure differential sensing means between the unheated water input and the heated water output to give an instantaneous response to a change in flow of the hot water. In this instance, the temperature responsive means which is connected to control the fluid supply to the pilot valve functions as a vernier adjustment.

The above and other objects and advantages of the invention will become apparent more readily from the following detailed description of a preferred embodiment of the invention taken in conjunction with the single FIGURE in the drawing which shows diagrammatically the various unique interconnections for operation of the respective component parts.

Referring now to one form of the invention as illustrated in the drawing, a conventional heat exchanger 10 is provided with a steam input pipe or line 11 and a condensate output line 12. The water to be heated is directed into the heat exchanger 10 at the connection 13 and flows through the pipes 14 in the usual manner. The heated water is removed from the heat exchanger 10 through a connection 15 for its intended use elsewhere.

A self operated pressure regulator identified by the numeral 16 is connected in the steam heat input line 11 and embodies a valve opening 17 which is controlled by a valve member 18 connected at one end of a valve stem 19. With the valve member 18 open, steam heat is supplied from a suitable source (not shown) connected to the line 20, through the valve opening 17, through the inlet connection 11 and into the heat exchanger 10.

The lower end 21 of the valve stem 19 is connected with a diaphragm 22, and a coil spring 23 is positioned to urge the valve stem 19 downwardly, closing the valve opening 17. Steam pressure from the downstream side of the valve opening 17 is communicated through a tube 24 having bleed port 24′, a tube 25, a constricted opening 26 to a chamber 27 so that pressure developed in the chamber 27 acts against the diaphragm 22 to counteract the action of the coil spring 23 and urge the valve member 18 toward an open position. In normal operation, the pressure developed in the chamber 27 is sufficient to overcome the action of the spring 23 resulting in the valve member 18 being moved to an open position.

The action of the self operated pressure regulator 16 is supplemented by a pilot valve 28 which contains four pressure chambers 29, 30, 31 and 32. The chamber 32 is in communication with the upstream side of the self-operated pressure regulator 16 through a tube 33, and the chamber 31 is communicated through a tube 34 to a T connection 35 between the tubes 24 and 25. The chamber 30 is communicated through a tube 36 to a point in the input line 11 which is adjacent the heat exchanger 10 so that the pressure of the steam heat input at the heat exchanger 10 is applied to the chamber 30 of the pilot valve 28. An upper hood defines the chamber 29 in the pilot valve 28 and is supplied with a suitable fluid pressure, such as air pressure for example, through a tube 37 which will be described in greater detail presently. Dual diaphragms 40 and 40a are spaced apart by a cowl and connected together at their approximate centers by a rod 40b to define an intermediate space 40c. The diaphragm 40 is smaller in diameter than the diaphragm 40a.

As seen in the drawing, the pilot valve 28 is provided with a valve member 38 positioned to control the opening 39a between the two chambers 31 and 32. A valve stem 39 is connected to the valve member 38 and extends upwardly through the chamber 31 and terminates against a diaphragm 40. A coil spring 41 is positioned to act against the upper end of the valve stem 29 to urge the valve member 38 into a closed position; such spring means constitutes essentially the only resilient load on both diaphragms.

A suitable source of air pressure (not shown) is connected to the line 42 and passes through a suitable conventional air filter 43. From the filter 43, the air pressure is directed through a tube 44 and a chamber 45 to a tube 37 for application to the chamber 29 in the pilot valve 28. A temperature-operated bleed valve 46 is connected with the chamber 45 to bleed air pressure from within the chamber 45 in response to the temperature of the heated water output at the connection 15.

An example of a suitable conventional temperature responsive bleed valve, indicated generally by the numeral 47, embodies a bronze tubing 48 which extends through a pipe connection 49 to a point in the vicinity of the heated water output 15 and is adaptable to expansion and contraction in response to the temperature of the heated water in the output uonnection 15. Positioned within the tubing 48 is a rod 50 formed of a suitable material having approximately zero coefficient of expansion such as, for example, an Invar alloy.

The bar 50 is attached to the tube 48 at its outermost end by a threaded connection 51. A linkage 52 is pivotable about a point 53 under the influence of the rod 50 which bears against the end 54 furthermost from the bleed valve 46. A hand operable adjustment 55 is provided to alter the response of the device 47, as desired. The adjusting mechanism is conventional and knob 55 is attached to an adjustable screw shank 55′ which passes through an opening at the upper end 54 of lever 52. By moving knob 55, the lateral position of shank 55′ is moved which determines the lateral extent of travel of the upper end 54 of lever 52 and hence the amount of movement of lever 52. In an alternative conventional embodiment, shank 55′ may be coupled as by threading to the left end of bar 50 to control the position of lever 52. Air bled from the chamber 45 through the valve 46 is directed to atmosphere through an opening 56.

To illustrate the operation of the system of the invention, assume that the system is in operation with the controls stabilized and with a constant steam pressure within the heat exchanger 10. If the flow of the hot water out from the connection 15 increases, the water is within the tubes 14 for a shorter period of time and, therefore, the temperature of the water will decrease. A decrease in temperature of the water within the tubes 14 will result, first, in the rate of condensation of the steam becoming greater. An increase in the steam condensate will cause a sag in steam pressure in the heat exchanger 10 and also in the input line 11 adjacent the heat exchanger.

The decrease in steam pressure in the input line 11 is communicated directly to the chamber 30 in the pilot valve 28 resulting in a decrease in pressure in the chamber 30. Since the pressure in the chamber 30 acts against the pressure in the chamber 29 and the pressure in the chamber 30 is decreased, the pressure in the chamber 29 being greater and acting on the longer diaphragm 40a results in the valve member 38 being opened further. Since diaphragm 40 has a smaller effective area, the force applied against it is smaller because the decreased pressure in chamber 29 acts on a smaller area. The differential in effective area between diaphragms 40 and 40a is believed to contribute to the effectiveness of the system over relatively wide ranges and provides a control over the response of pilot valve 28, particularly for low pressure operation.

With the valve 38 opened further, steam pressure through the tube 33 will be increased and will pass through the opening 39a, the tube 34, the T connection 35, the tube 25 and to the chamber 27, resulting in the valve member 18 being opened a greater amount. Thus, an increase in the steam flow will restore the pressure in the line 11 and the heat exchanger 10. This is the initial result of an increased water output through the connection 15.

If the increased demand for hot water at the output 15 is continued, the cooler water delivered from the tubes 14 will reach the output connection 15 and affect the temperature responsive valve 47. The decrease in temperature will cause the tube 48 to contract and move the bar 50 to the left as viewed in the drawing. Moving the bar 50 to the left pivots the linkage 52 in a counterclockwise direction to close the bleed valve 46 and, thus, increase the air pressure in the chamber 45. This increased air pressure is communicated through tube 37 to the chamber 29 in the pilot control valve 28.

An increase in pressure in the chamber 29 acts against the larger diaphragm 40a and moves the valve 38 to a further opened position which communicates a still greater steam pressure from the tube 33, through the chambers 32 and 31 and to the chamber 27 beneath the diaphragm 22 in the regulator 16 to open the valve member 18 a greater amount to pass a greater quantity of steam to the heat exchanger 10.

With the cycle described above, the system now will operate at a new, higher pressure to maintain the temperature constant at the heated water output connection 15. It may be seen in the cycle described above that initial changes in steam pressure are corrected before it has an opportunity to reflect a change in temperature at the heated water output connection 15. Therefore, a separate steam pressure regulator on the steam supply is not required by the system of the invention.

Since the system is operable initially by the steam pressure, a considerable decrease in air consumption is realized. Other advantages which will now be apparent are high accuracy, nominal cost, fast and stable operation and a greatly increased sensing speed. Moreover, it should be noted that in event of failure of the air control pressure applied at the tube 42, the pressure in the chamber 29 will be reduced and the valve 38 will close to provide a safety feature. Therefore, the system of the invention is uniquely adaptable for rapid and accurate control of heat exchangers with wide ranging, fast changing loads, and provides advantages not obtainable by heretofore known systems.

While the invention has been described in considerable detail and a preferred form thereof illustrated, it is to be understood that various changes and modifications may be made without departing from the true spirit and scope of the invention as set forth in the following claims.

I claim:
1. A control system for a hot water supply comprising a heat exchanger having a chamber enclosing a plurality of tubular water carriers, an input connection to supply water to said tubes, a hot water output connection from said tubes, a steam pressure input to said chamber, and a condensate output from said chamber; a self operated pressure regulator connected in the steam pressure input side of said heat exchanger; a fluid controlled pilot valve connected to supplement the self control of said regulator; means to connect a separate source of fluid pressure to said pilot valve; said pilot valve including a body having a bonnet opening, a pilot-valve member, a diaphragm assembly bodily secured to and removable from said bonnet opening, said assembly comprising two diaphragms, a cowl spacing the peripheries of said diaphragms and defining with said diaphragms an enclosed chamber, a hood over the outer of said diaphragms, the outer of said diaphragms having a larger effective area than the inner of said diaphragms, stem means connecting said pilot-valve member with said inner diaphragm, and spring means beneath said inner diaphragm and preloading said stem means against said inner diaphragm and constituting essentially the only resilient load on both said diaphragms, the inner diaphragm being responsive to changes in steam pressure in said heat exchanger, and the outer diaphragm being responsive to changes in the pressure of said separate fluid; temperature responsive means connected in the hot water output connection from said heat exchanger to control the fluid pressure to said pilot valve; and means to connect the steam pressure at the heat input side of the heat exchanger intermediate the heat exchanger and the self operated pressure regulator to said pilot valve to supplement the control of the pilot valve.

2. A control system for a hot water supply as set forth in claim 1, wherein the temperature responsive means includes a bleed valve disposed in the fluid pressure, and means to control said bleed valve in response to the temperature of the hot water.

References Cited in the file of this patent

UNITED STATES PATENTS

| | | |
|---|---|---|
| 2,006,035 | Stewart | June 25, 1935 |
| 2,029,203 | Soderberg | Jan. 28, 1936 |
| 2,596,812 | Carson | May 13, 1952 |
| 2,852,196 | Spence | Sept. 16, 1958 |